(12) United States Patent
Farnsworth

(10) Patent No.: US 7,841,228 B2
(45) Date of Patent: Nov. 30, 2010

(54) METHOD OF DETECTING HYDROGEN SENSOR SATURATION IN A HYDROGEN POWERED FUEL CELL

(75) Inventor: Jared M. Farnsworth, Holyoke, CO (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 682 days.

(21) Appl. No.: 11/671,164

(22) Filed: Feb. 5, 2007

(65) Prior Publication Data
US 2008/0184780 A1  Aug. 7, 2008

(51) Int. Cl.
G01M 3/04 (2006.01)
(52) U.S. Cl. .................................................. 73/40.7
(58) Field of Classification Search ................. 73/40.7
See application file for complete search history.

(56) References Cited

U.S. PATENT DOCUMENTS

| | | | |
|---|---|---|---|
| 3,851,520 A | | 12/1974 | Schluter et al. |
| 4,958,513 A | | 9/1990 | Yasunaga et al. |
| 5,763,113 A | | 6/1998 | Meltser et al. |
| 6,279,384 B1 | * | 8/2001 | Heikkinen et al. ........... 73/40.7 |
| 6,887,606 B2 | | 5/2005 | Parr et al. |
| 6,913,847 B2 | | 7/2005 | Wells et al. |
| 7,087,151 B2 | | 8/2006 | Mizutani et al. |
| 7,104,110 B2 | | 9/2006 | Oishi et al. |
| 7,147,945 B2 | * | 12/2006 | Balliet et al. ................... 429/12 |
| 7,178,385 B2 | * | 2/2007 | McCoy et al. ................. 73/40.7 |
| 7,186,381 B2 | * | 3/2007 | Penner et al. .................. 422/98 |
| 7,628,959 B2 | * | 12/2009 | Penner et al. .................. 422/98 |
| 2003/0022040 A1 | * | 1/2003 | Wells ........................... 429/23 |
| 2004/0031314 A1 | * | 2/2004 | Flynn et al. ................... 73/40.7 |
| 2004/0237631 A1 | * | 12/2004 | Cohen et al. .................. 73/40.7 |
| 2005/0228596 A1 | * | 10/2005 | Shoji ............................. 702/24 |
| 2006/0162428 A1 | * | 7/2006 | Hu et al. ....................... 73/40.7 |
| 2007/0056354 A1 | * | 3/2007 | Schweighardt et al. ....... 73/40.7 |

* cited by examiner

Primary Examiner—Hezron Williams
Assistant Examiner—Rodney T Frank
(74) Attorney, Agent, or Firm—Gifford, Krass, Sprinkle, Anderson & Citkowski, P.C.

(57) ABSTRACT

In one aspect there is disclosed a method of detecting a hydrogen leak in a fuel cell system that includes the steps of a) providing a hydrogen sensor, b) determining sensor characteristics, c) measuring a hydrogen concentration, d) determining if a hydrogen leak is occurring, and e) performing an action based on the determination of step d). The step of determining the sensor characteristics may include determining an upper detection limit of the hydrogen sensor, as well as determining a minimum time period at the upper detection limit before saturation of the sensor.

8 Claims, 2 Drawing Sheets

METHOD OF DETECTING HYDROGEN SENSOR SATURATION IN A HYDROGEN POWERED FUEL CELL

FIELD OF THE INVENTION

The invention relates to a method of detecting a hydrogen leak in a fuel cell system.

BACKGROUND OF THE INVENTION

Electrochemical fuel cells are generally known in the art and convert fuel and an oxidant to electricity. One such fuel cell is a solid polymer electrochemical cell and includes a membrane electrode assembly "MEA" that includes an ion exchange membrane or other electrolyte disposed between an anode and cathode. The MEA may include a catalyst or other catalytic material at each interface between the membrane and electrode to induce a desired electrochemical reaction. The electrodes are electrically coupled to provide a circuit for conducting electrons between the electrodes through an external circuit.

In a hydrogen powered fuel cell, hydrogen and air are supplied to electrodes on either side of an ion exchange membrane. Hydrogen is typically supplied to the anode where a catalyst promotes a separation into protons and electrons which are conducted through the external circuit. On the opposing side of the membrane, air is provided to the cathode where oxygen in the air reacts with the protons passing through the ion exchange membrane to produce byproduct water.

The fuel source in such hydrogen powered systems is flammable and should be monitored closely to prevent a dangerous condition. Examples are known in the art of providing hydrogen sensors in a fuel cell to monitor the hydrogen concentration and shut down or otherwise warn an operator of the fuel cell of the dangerous hydrogen concentration.

However, hydrogen sensors utilized to detect the concentration of a hydrogen fuel require a minimum presence of oxygen at the sensor location in order to detect the hydrogen concentration. If the hydrogen concentration at the sensor location is great enough to reduce the oxygen concentration below a required level to accurately detect hydrogen, the concentration of hydrogen detected by the sensor could be less than the actual hydrogen concentration at the sensor location. This situation may be described as sensor saturation.

There is therefore a need in the art for an improved method of detecting a hydrogen leak in a fuel cell that prevents false hydrogen concentration readings as a result of sensor saturation. There is also a need in the art for an improved method of detecting a hydrogen leak in a fuel cell that detects a hydrogen concentration before sensor saturation provides a false hydrogen concentration reading.

SUMMARY OF THE INVENTION

In one aspect there is disclosed a method of detecting a hydrogen leak in a fuel cell system that includes the steps of a) providing a hydrogen sensor, b) determining sensor characteristics, c) measuring a hydrogen concentration, d) determining if a hydrogen leak is occurring, and e) performing an action based on the determination of step d).

The step of determining the sensor characteristics may include determining an upper detection limit of the hydrogen sensor, as well as determining a minimum time period at the tipper detection limit before saturation of the sensor.

DETAILED DESCRIPTION OF THE PREFERRED EMBODIMENTS

Figure 1:
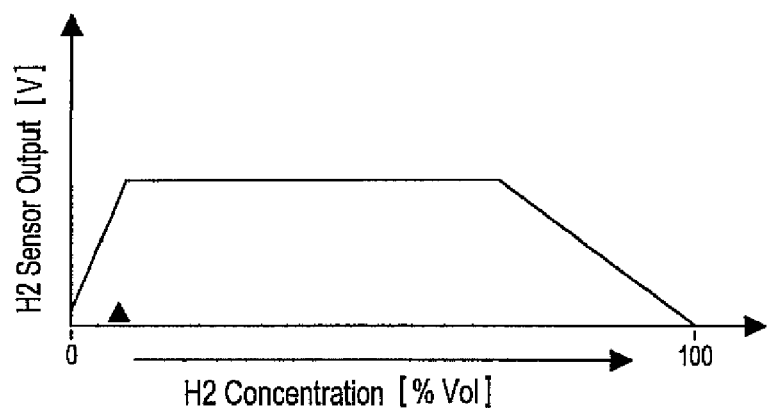
FIG. 1 is a plot of a hydrogen sensor output plotted versus a hydrogen concentration detailing hydrogen sensor saturation.

Referring to FIG. 1, there is shown a generalized plot of a hydrogen sensor output detailing hydrogen sensor saturation. As can be seen from the plot, the hydrogen sensor output increases in correlation with an increase in the hydrogen concentration until it reaches a hydrogen sensor upper detection limit that is represented as a flat section of the line. As the hydrogen concentration further increases, it reaches a sensor saturation point where the slope of the line turns negative representing a decreased hydrogen sensor output that does not correlate to an increasing hydrogen concentration. As the hydrogen concentration increases after the saturation point, the output of the sensor decreases as the hydrogen concentration increases. This phenomenon can cause a situation where a hydrogen sensor output could decrease indicating that a hydrogen concentration is decreasing when in fact the hydrogen concentration is increasing. This scenario could result in the failure of a hydrogen sensor leak detection system to detect a hydrogen leak as a result of hydrogen sensor saturation.

Figure 2:
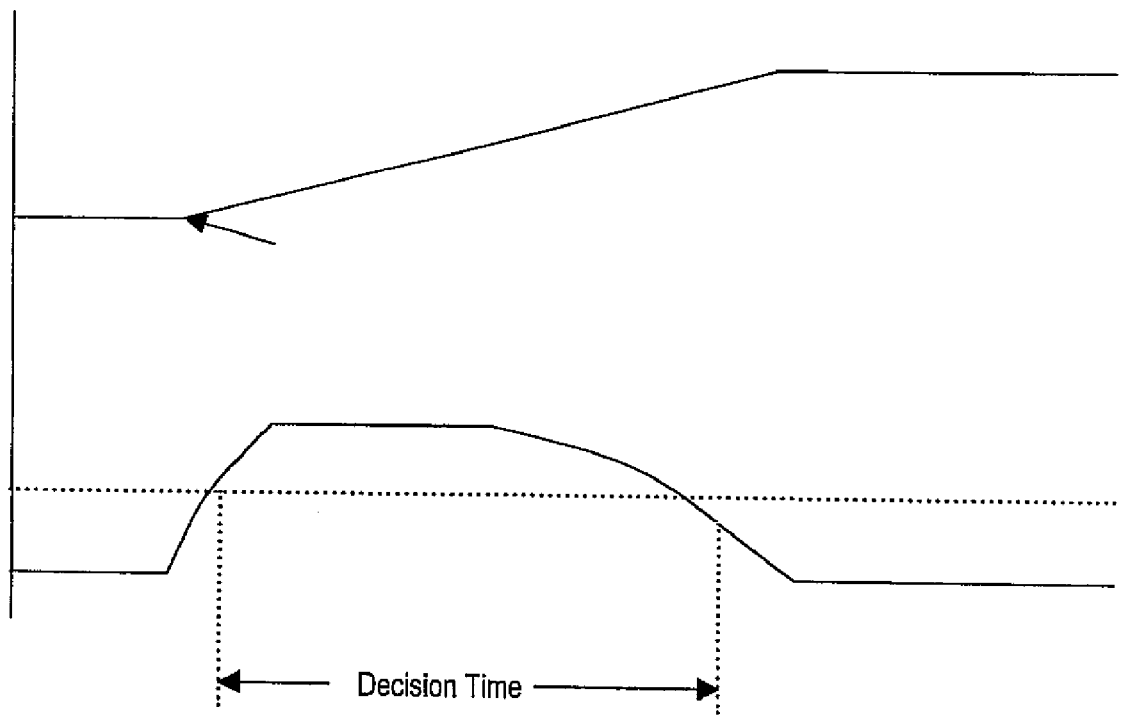
FIG. 2 is a plot of a hydrogen concentration detected by a hydrogen sensor as a function of time detailing a sensor saturation scenario.

Referring to FIG. 2, there is shown a hydrogen sensor leak detection system failure scenario that does not detect a hydrogen leak. As can be seen in the figure, there is plotted a hydrogen concentration at a hydrogen sensor location having an increasing hydrogen concentration on the upper part of the figure. Below that is plotted a hydrogen concentration that is detected by the hydrogen sensor as a bold line as a function of time. As can be seen, the sensor detects a hydrogen concentration that increases as the volume of hydrogen increases until it plateaus and reaches an upper detection limit of the sensor forming a flat line in the lower plot. The flat line continues until it reaches a sensor saturation point wherein the slope of the line decreases over time as the hydrogen concentration increases. This negatively sloped line represents a hydrogen sensor saturation. In FIG. 2, the dashed horizontal line represents the detection limit which defines the detected hydrogen concentration limit used to indicate a leak is occurring. The dashed line represents a hydrogen concentration that is less than the upper detection limit of the sensor, as will be discussed in more detail below. The decision time represented by the space between the two vertical dashed lines is the time required for the hydrogen concentration to be above the detection limit for a hydrogen leak to be identified. The use of a decision time is utilized to prevent a false positive leak detection in such a system. As can be seen by this figure, the decision time is spanning a portion of the plot falls below a detection limit within a decision time which may result in a hydrogen sensor leak detection system failing to detect the hydrogen leak.

To solve the potential false leak detection demonstrated by FIG. 2, there is provided a method of detecting a hydrogen leak in a fuel cell system. The method includes the steps of providing a hydrogen sensor, determining the sensor characteristics, measuring a hydrogen concentration, determining if a hydrogen leak is occurring, and performing an action based on the determination of the previous step.

Figure 4:
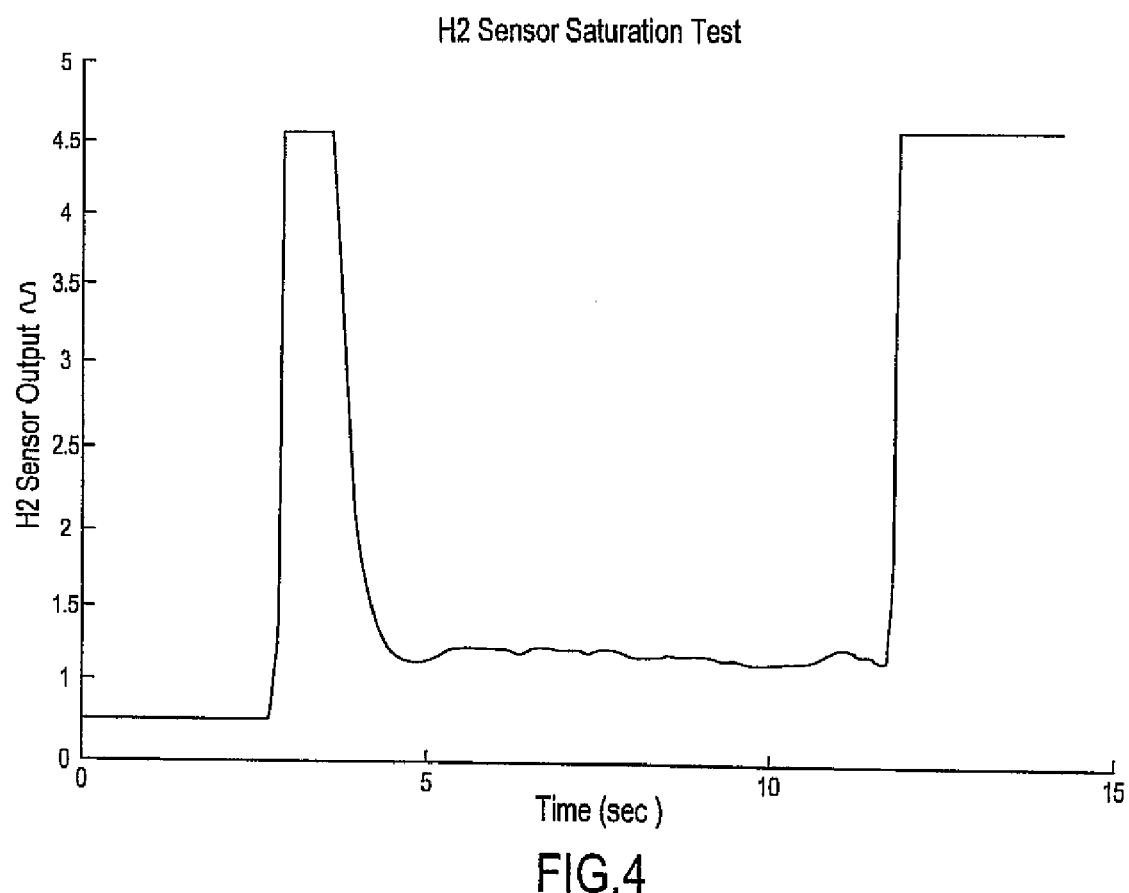
FIG. 4 is a plot of a hydrogen sensor output as a function of time for a simulated hydrogen leak.

The step of determining the sensor characteristics includes determining an upper detection limit of the hydrogen sensor. Additionally, the step of determining the sensor characteristics may also include determining a minimum time period at the upper detection limit before saturation of the sensor occurs. Referring to FIG. 4, there is shown a plot of an output voltage of a hydrogen sensor as a function of time. As can be seen from the plot, the output voltage of the sensor increases when the hydrogen concentration increases until it reaches a plateau representing the upper detection limit of the sensor and indicating the beginning of hydrogen sensor saturation. It can be seen from the plot that saturation represented by the point where the line slopes downward may occur quickly in a matter of seconds for a hydrogen sensor. Various tests can be performed on hydrogen sensors to determine at what concentration saturation of the sensor begins, as well as the time period required at the upper detection limit before the sensor displays a decreasing output as a result of hydrogen sensor saturation. In one aspect, the step of determining the sensor characteristics may also include applying a safety factor to the determined characteristics. A safety factor can be included to prevent possible hydrogen leaks from not being detected at the boundary regions of the determined characteristics. Suitable safety factors may be utilized to provide a suitable margin for error of detection and may be adjusted based on various characteristics associated with the fuel cell system.

Figure 3:
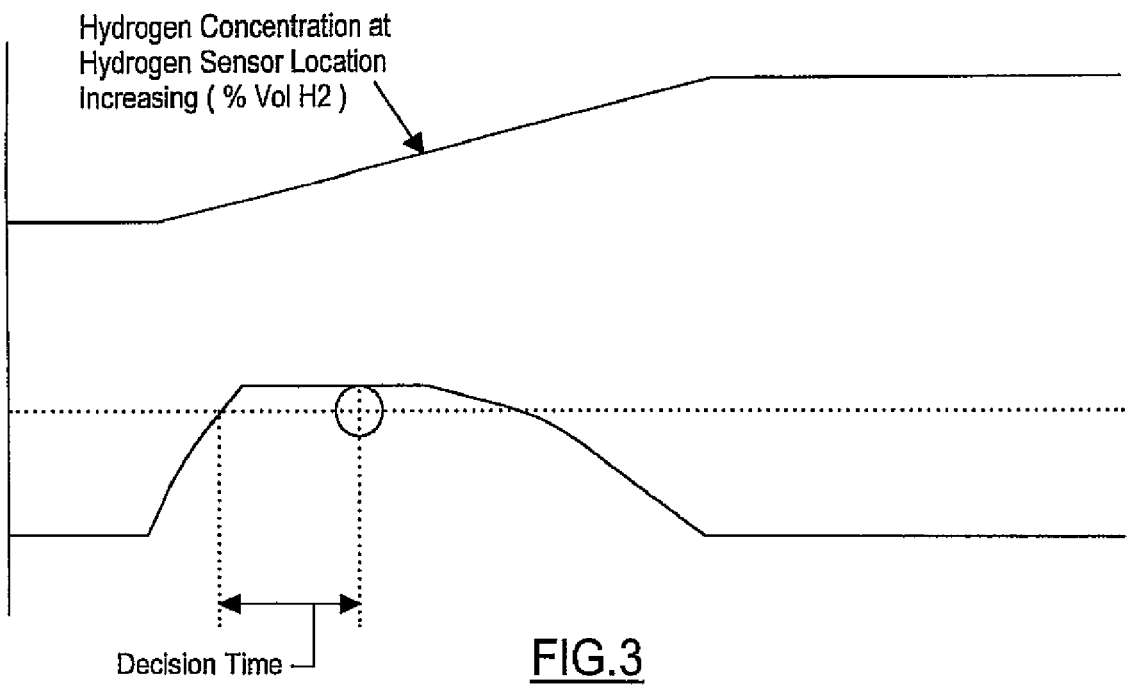
FIG. 3 is a plot of a hydrogen concentration detected by a hydrogen sensor as a function of time detailing the method of the invention for preventing false hydrogen concentration readings of the sensor.

Referring to FIG. 3, there is shown a plot similar to that of FIG. 2 utilizing the method of detecting a hydrogen leak. As can be seen in the plot, again a hydrogen concentration at a hydrogen sensor location is shown in an upper portion of the plot demonstrating an increasing hydrogen concentration. The lower portion of the plot details a line of a hydrogen concentration detected by the hydrogen sensor. As can be seen in the figure, the hydrogen sensor upper detection limit is reached before saturation of the sensor occurs. The minimum amount of time once the hydrogen sensor's upper detection limit is reached before saturation is determined in the step of determining the sensor characteristics, as described above. The hydrogen concentration should not reach a hydrogen sensor's upper detection limit unless a hydrogen leak is occurring within a system. If the hydrogen concentration at the hydrogen sensor location reaches a threshold of the hydrogen sensor upper detection limit for a decision time, in the step of determining if a hydrogen leak is occurring finds that a hydrogen leak is occurring.

Based on the findings of the determination step, the method may find a leak is occurring or not and various actions can be performed. As can be seen in FIG. 3, the decision time period represented by the dashed vertical lines is chosen such that it is less than a time period required before saturation of the sensor can occur when at a concentration above the hydrogen detection threshold. As a result, there is not a scenario as demonstrated in FIG. 2 where the concentration determined at the end of the decision time would be less than the detection limit used by the system to determine if a hydrogen leak is occurring.

In one aspect, the sensor outputs a variable voltage that corresponds to the hydrogen concentration. In this manner, the step of determining if a leak is occurring includes determining if the voltage is above a predetermined value corresponding to the upper detection limit of the sensor.

The concentration detection limit, the upper detection limit, and the time before sensor saturation occurs are characteristics of a hydrogen sensor and the method can be adapted to those sensor characteristics. For example, the detection time may be determined as a function of a given sensor's saturation time. Similarly, the other characteristics of a given hydrogen sensor can be determined through testing as outlined above. It should be realized that various hydrogen sensors may be utilized in the method of the invention and the steps of the method may be performed on any hydrogen sensor.

As described above, various actions may be performed following the step of determining if a leak is occurring based on the type of fuel cell system being utilized, as well as the position of the hydrogen sensor and other factors that may be utilized for various fuel cell systems. The actions that may be performed include shutting down the fuel cell system, sending an error signal, creating an error report, shutting down a portion of the system, rerouting a portion of the system, repeating the steps of the method to verify the determination or performing an alternative leak detection method. It should be realized that additional actions affecting the operation of the fuel cell may also be performed based on the type of system utilizing the method.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A method of detecting a hydrogen leak in a fuel cell system comprising the steps of:
   a) providing a hydrogen sensor outputting a variable voltage corresponding to a hydrogen concentration;
   b) determining sensor characteristics including determining an upper detection limit where the voltage does not increase in relation to an increase in hydrogen concentration;
   c) measuring a hydrogen concentration;
   d) determining if a hydrogen leak is occurring including determining if the voltage is above a predetermined value corresponding to the upper detection limit of the sensor;
   e) performing an action based on the determination of step d).

2. The method of claim 1 wherein the step of determining the sensor characteristics includes determining a minimum time period at the upper detection limit before saturation of the sensor.

3. The method of claim 1 wherein the step of determining the sensor characteristics includes applying a safety factor to the characteristics.

4. The method of claim 1 wherein the step of determining if a leak is occurring includes applying a detection limit.

5. The method of claim 1 wherein the actions performed in step e) include shutting down the fuel cell system, sending an error signal, creating an error report, shutting down a portion of the system, rerouting a portion of the system, repeating steps a) through d), performing an alternative leak detection method and performing an action affecting the operation of the fuel cell system.

6. A method of detecting a hydrogen leak in a fuel cell system comprising the steps of:
   a) providing a hydrogen sensor;
   b) determining an upper detection limit of the hydrogen sensor where the voltage does not increase in relation to an increase in hydrogen concentration;
   c) determining a minimum time period at the upper detection limit before saturation of the sensor;
   d) measuring a hydrogen concentration;
   e) determining if a hydrogen leak is occurring, including determining if a voltage is above a predetermined value corresponding to the upper detection limit of the sensor;
   f) performing an action based on the determination of step e).

7. The method of claim 6 wherein the sensor outputs a variable voltage corresponding to the hydrogen concentration.

8. The method of claim 6 wherein the actions performed in step f) include shutting down the fuel cell system, sending an error signal, creating an error report, shutting down a portion of the system, rerouting a portion of the system, repeating steps a) through e), performing an alternative leak detection method and performing an action affecting the operation of the fuel cell system.

* * * * *

UNITED STATES PATENT AND TRADEMARK OFFICE
CERTIFICATE OF CORRECTION

| | | |
|---|---|---|
| PATENT NO. | : 7,841,228 B2 | Page 1 of 1 |
| APPLICATION NO. | : 11/671164 | |
| DATED | : November 30, 2010 | |
| INVENTOR(S) | : Jared M. Farnsworth | |

It is certified that error appears in the above-identified patent and that said Letters Patent is hereby corrected as shown below:

Column 1, Line 67, Replace "tipper" with --upper--

Column 4, Line 45, Replace "a" with --said--

Signed and Sealed this

Thirteenth Day of December, 2011

David J. Kappos
*Director of the United States Patent and Trademark Office*